Feb. 10, 1959
H. B. DANE
2,872,778
INTERNAL COMBUSTION POWERED FLUID MOTOR AND
HYDRAULIC PROPULSION SYSTEM
Filed Dec. 27, 1955
2 Sheets-Sheet 1

INVENTOR
Harold B. Dane

Feb. 10, 1959
H. B. DANE
2,872,778
INTERNAL COMBUSTION POWERED FLUID MOTOR AND
HYDRAULIC PROPULSION SYSTEM
Filed Dec. 27, 1955
2 Sheets-Sheet 2
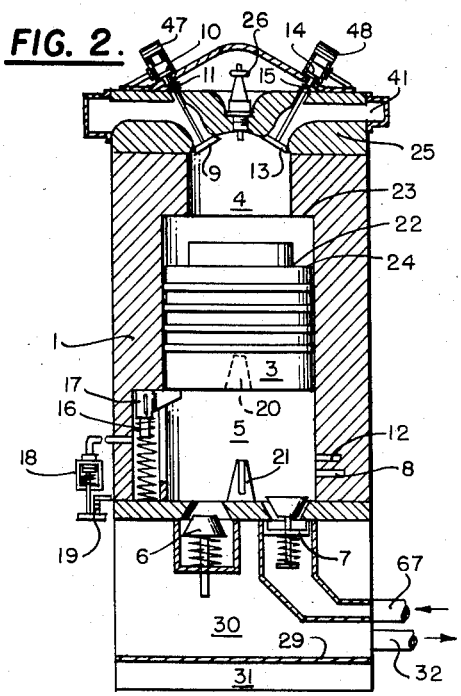
FIG. 2.
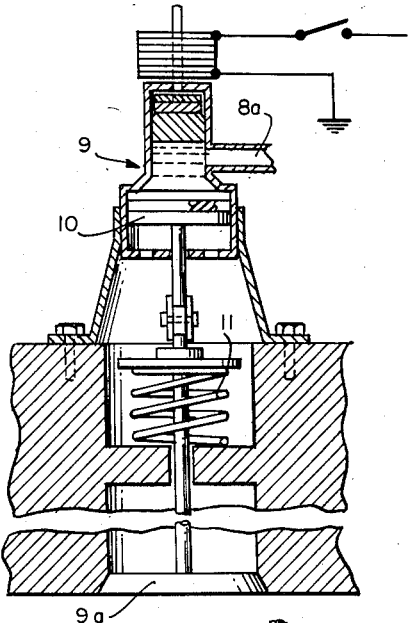
FIG. 6.
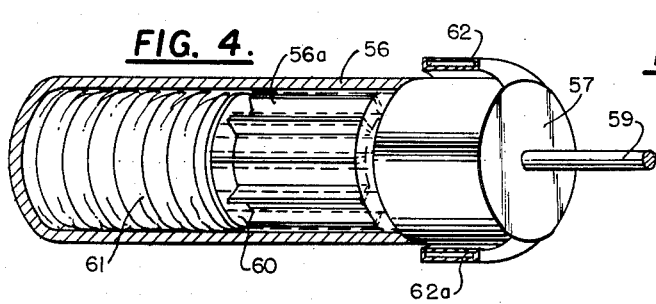
FIG. 4.
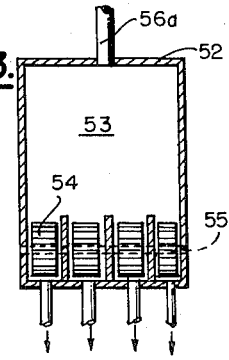
FIG. 3.
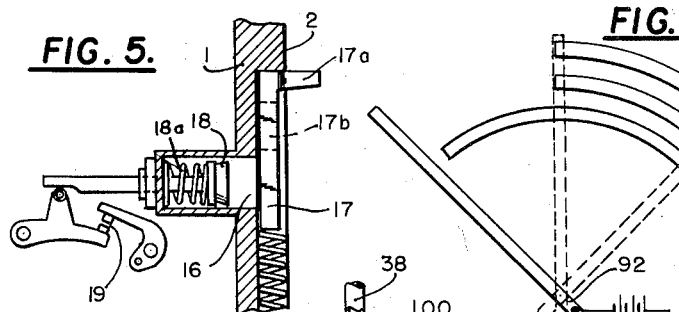
FIG. 5.
FIG. 8.
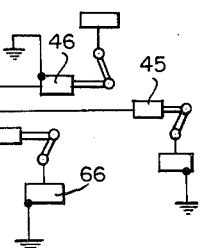
FIG. 7.
INVENTOR
Harold B. Dane

United States Patent Office 2,872,778
Patented Feb. 10, 1959

2,872,778

INTERNAL COMBUSTION POWERED FLUID MOTOR AND HYDRAULIC PROPULSION SYSTEM

Harold B. Dane, Wheaton, Md.

Application December 27, 1955, Serial No. 555,479

5 Claims. (Cl. 60—12)

This invention relates to power plants and propulsion systems of general utility and particularly to those in the automotive field wherein the forces created by internal combustion are transformed into useful work at a controlled, variable rate. Briefly, the propulsion system is comprised of an internal combustion engine in which free pistons work directly on a power-transmitting fluid, a high pressure accumulator tank which receives and stores liquid under pressure from the engine, a fluid-flow metering system, a selective system of delivering fluid under pressure to one or more outlets, a flow-regulator to equalize delivery of the fluid to the various outlets, a variable torque-variable speed transmission or power head, and a low pressure accumulator tank for storing and delivering returning fluid to the engine.

An object of the invention is the provision of a power plant which converts the force created by an internal combustion explosion directly into hydraulic pressure useful for work and power.

Another object is the provision of a power plant which is two cycle, self-starting, self-charging, self-timing, and governor controlled for variable speed operation.

Another object is the provision of a power plant in conjunction with a hydraulic power-transmitting mechanism.

Another object is to provide, in connection with a power plant and a pressure tank, a system for distribution of the liquid under pressure to a power outlet or power transmitting mechanism, incorporating in the distribution system a fluid flow metering valve, a selective device or valve for determining route of flow of the liquid, and a flow-regulating device for equalizing the distribution of fluid where more than one power outlet or power-transmitting mechanism is used in the system.

Another object is the provision of a power plant in conjunction with a pressure-accumulator-type tank which receives and stores liquid under pressure for subsequent useful work at desired rates, the governor-controlled speed of the power plant being in inverse ratio to the pressure in the tank.

Another object is the provision of a power transmitting mechanism which automatically adjusts output speed according to torque demands created by load factor, current speed, and desired speed, and which operates at peak efficiency at all times.

Another object is the provision of a return tank in which liquid is stored under pressure, and which tank subsequently furnishes liquid under pressure to the engine cylinders for the purposes of returning the pistons to firing position and in the process, replenishing the cylinders with liquid to be driven by the pistons into the outgoing or high-pressure tank.

Further objects are the provision of a power plant which has a minimum number of parts, which operates at a high degree of efficiency, which is subject to wide variation in its overall size and the arrangements of its components, and which, in and of itself, is both an engine and a pump.

Still further objects, advantages, and salient features will become apparent from a consideration of the description to follow, the accompanying drawings, and the appended claims.

In the drawings:

Figure 2 is a more detailed view of a slightly modified form of one of the cylinders, illustrating one possible arrangement of valving as well as other details;

Figure 3 is an enlarged view of the fluid flow equalizer;

Figure 4 is a more detailed view of the power transmitting unit which may be used as a transmission or as a power head for any number of power outlets;

Figure 5 is an enlarged fragmentary detail of the sliding valve and ignition mechanism shown in Figure 2;

Figure 6 is an enlarged fragmentary detail of one of the exhaust or intake valves and related parts of the type shown in Figure 1;

Figure 7 is an enlarged sectional detail of the engine governor shown in Figure 1; and Figure 8 is a diagrammatic view of the electric circuit for controlling the solenoids.

Figure 1:
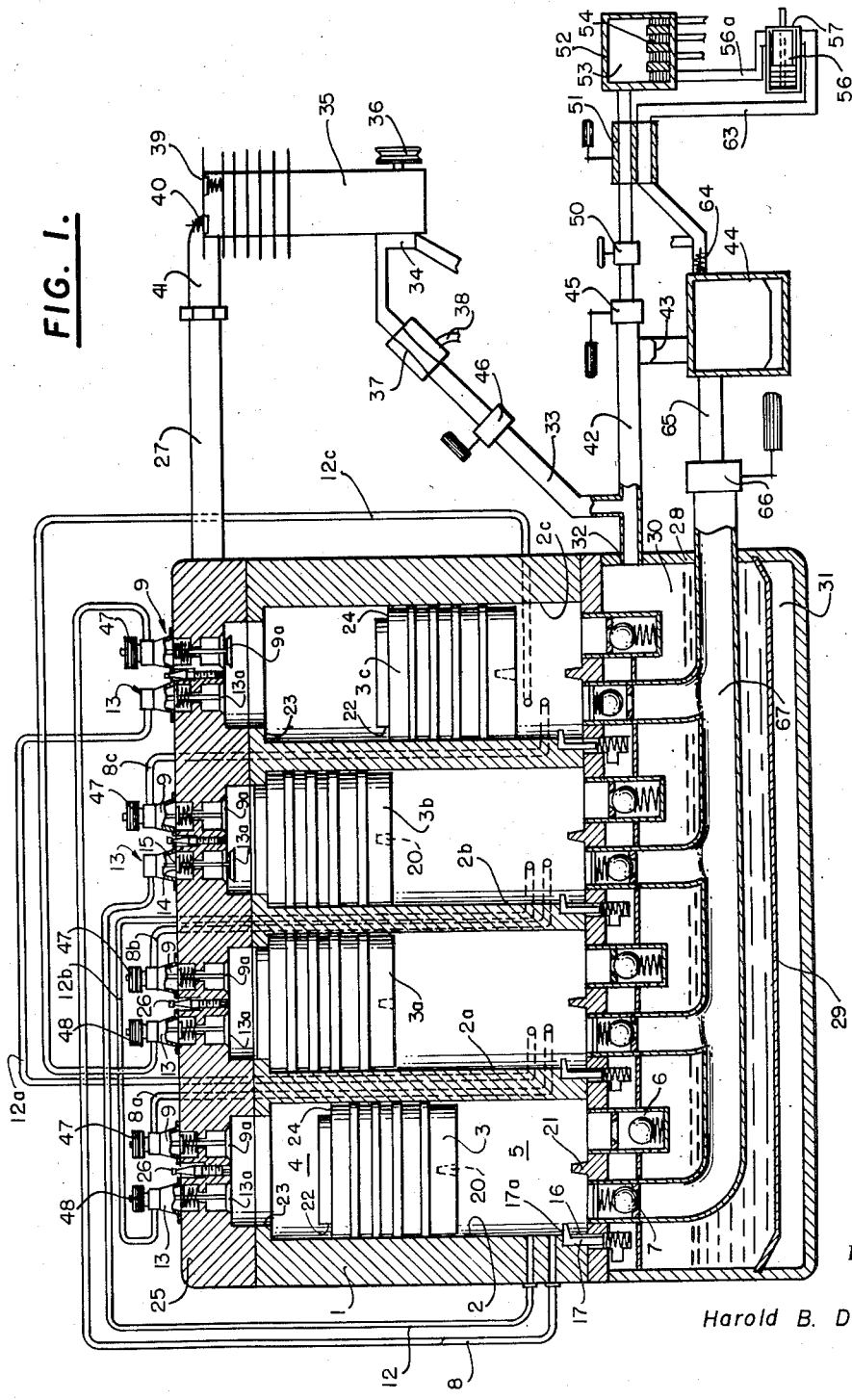
Figure 1 is a longitudinal sectional view of the power plant and the components of the hydraulic propulsion system.

Referring to the drawings, a cylinder block 1 is composed of at least four cylinders 2, 2a, 2b and 2c, each of which contains a free floating piston 3, 3a, 3b and 3c, the area 4 above each piston being the combustion area and the area 5 below each piston being a chamber for liquid. An output pressure relief valve 6 and an input pressure relief valve 7 are located at the lower end of each cylinder. An outlet line 8, 8a, 8b and 8c is provided in each cylinder for liquid pressure to be transmitted to the exhaust valve mechanism 9 of the next previously fired cylinder. As seen in Figure 6, the liquid pressure thus transmitted activates a piston 10 which in turn overcomes the valve spring 11 and causes the valve proper 9a to open. Similar outlet lines 12, 12a, 12b and 12c lead from respective cylinders to the intake valve mechanism 13 of the second succeeding cylinder to be fired. Fluid pressure against a piston 14 similar to piston 10, causes the spring 15 on the intake valve 13 to be overcome, and the intake valve proper 13a opens. As seen in Figure 5, a further opening or outlet 16 in the cylinder wall is provided with a sliding valve 17 which remains closed until the bottom edge of the piston 3 strikes the valve abutment 17a and forces it down and open. When valve 17 is opened, fluid pressure is transmitted through port 17b to a piston 18 which overcomes the loading of spring 18a and opens ignition points 19 respectively controlling the next cylinder to be fired. Each piston 3 is provided with a recess 20 in the bottom which provides slow-down buffer action when the piston approaches the bottom of its stroke and is forced over the buffer rod 21 which extends up from the bottom of the cylinder. Each piston is also provided with an inset portion 22 at the top which fits rather closely inside the protruding lips 23 at the top of the cylinder. When the piston is forced back upon the exhaust stroke, air is trapped between the piston shoulder 24 and the protruding lips 23, thus providing a cushion which stops the upward travel of the piston.

Mounted on the top of the cylinder block 1 is a cylinder head 25 into which are fitted the spark plugs 26. The intake valves 13 and exhaust valves 9, as well as the intake manifold 27, may or may not be mounted in or upon the cylinder head, depending upon the design desired.

The fluid forced through valve 6 at the bottom of the cylinder may be stored in a pressure accumulator storage tank 28 which may be connected to the bottom of the cylinder block 1 as shown in the drawings, or the fluid may be piped to the tank at a remote location (not shown). The storage tank 28 is provided with a diaphragm 29 which separates the fluid in the upper section 30 from the compressed air in the lower section 31.

An opening 32 from the fluid section 30 of the tank 28 is provided through which fluid under pressure is transmitted through a line 33 to a power wheel 34 which is mounted upon and drives a compressor 35, and indirectly, through V-belt pulley 36 drives accessories such as a fan (not shown) and generator (not shown). Line 33 is provided with a conventional restrictive valve 37 shown in detail in Figure 7, which regulates a fluid flow through line 33 in inverse ratio to the pressure in the pressure tank 28. A pressure line 38 connects the pressure tank 28 with the restrictive valve 37 and furnishes the restrictive valve with a constant reading of the pressure in the tank. The compressor 35 pulls air or air-fuel mixture through the intake valve 39 and pumps it out through the exhaust valve 40 to the intake manifold 41. A carburetor (not shown) can be utilized on the intake side of the compressor 35, or a fuel injection system can be used to inject fuel into the intake manifold with the air coming in from the compressor, or the fuel may be injected into the combustion chamber direct.

Referring to Figures 1 and 7, the pressure sensitive valve 37 in the work line 33 is subjected to the pressure in the high pressure fluid reservoir 28 at all times during the operation of the engine. Pressure is transmitted from the high pressure reservoir 28 through lines 32, 33 and 38, the latter leading to the fluid chamber 100 in the upper portion of the valve body 37 and operates on the larger upper end of the piston 101. Since the upper end of the piston 101 is larger in area than the lower end of the piston, a differential pressure is created, allowing the piston 101 to move downward, even though the pressure in the compressible line 102 is the same as the pressure in the work line 33 and line 38. The fluid in the fluid chamber 103 in the lower portion of the valve body 37 is thus subjected to an increasing or decreasing amount of pressure, according to the amount of pressure in the high pressure fluid reservoir. Higher pressure in the reservoir 28 causes a higher pressure in the fluid in the fluid chamber 103, causing a greater restriction or closing of the compressible fluid line 102, thereby decreasing the flow of fluid through the line 33 to the compressor, and thereby decreasing the speed of the compressor, which, in effect, decreases the amount of fuel-air mixture available to the engine and thus decreasing the speed of the engine. When the pressure in the high pressure fluid reservoir 28 begins to drop, the pressure on the compressible line 102 decreases, allowing it to increase in diameter, thereby allowing more fluid flow, more compressor action, and more speed of the engine. The non-compressible line 104 carries a sufficient flow of fluid to operate the compressor fast enough to keep the engine running at idle speed.

The ignition system for the engine receives its current from a battery and coil (not shown) or a magneto (not shown), but no distributor is necessary since each cylinder has its own set of points 19 which are opened in the manner previously described.

The work line 42 leading from the pressure tank 28 is provided with a pressure relief valve 43 which bleeds fluid to the lower-pressured return tank 44 when pressure in the main tank 28 becomes excessive. Provided next in the work line 42 is a solenoid operated valve 45 which closes and seals the pressure in the main tank 28 when the ignition is turned off. A similar solenoid valve 46 in the compressor line 33 is provided for sealing that line when the ignition is turned off.

For purposes of stopping and starting the engine, each exhaust valve 9 is provided with a solenoid 47 which opens the exhaust valve temporarily when the ignition is turned off. The intake valves 13 of the first two cylinders 2 and 2a are provided with a solenoid 48 which opens the intake valves temporarily when the ignition is turned to "start," and a solenoid (not shown) is provided on the ignition points 19 of the first cylinder 2, to open the points when the ignition is turned to the furthest position in the "start" range.

Beyond the solenoid valve 45 in the work line 42 is a fluid metering valve 50 which governs the amount of fluid released from the high pressure tank 28 to the power head or heads. In an automotive system this metering valve 50 would be connected to the accelerator pedal (not shown). Beyond the metering valve 50 is provided a selector valve 51 for the purpose of directing the fluid flow to accomplish either forward, neutral or reverse. The selector valve is so designed that fluid entering from the work line 42 may be channeled in either of three directions, and the returning fluid will always be channeled into the return flow line leading to the low pressure return tank 44. Beyond the selector valve 51 in the work line 42 is a fluid-flow equalizing device 52 which divides the fluid flow equally between the power heads 56 through lines 56a. When only one power head is used, this equalizer 52 is not necessary. The equalizer has a reception chamber 53 into which the fluid is received from the selector valve 51. A bladed wheel 54 for each power head 56 is mounted rigidly on a common shaft 55 and fitted into the housing of the equalizer with close tolerance so that, when one of the bladed wheels is turned by hydraulic pressure, the others also turn by virtue of being mounted on the same shaft 55. The equalizer would thus prevent one power head from spinning and absorbing all the flow of fluid when the load on that power head became less than the load on any of the others.

The work line 42 extends from the equalizer to the power heads 56. As seen in Figure 4, each power head is composed of a housing 57, a bladed wheel 56a attached to an output power shaft 59, a sliding tubular collar 60 which is circular on the outside and has fingers on the inside which mesh with the bladed wheel and fill the spaces between blades, a collapsible diaphragm 61 which is filled with air under pressure (springs could be used in lieu of the diaphragm). As fluid pressure and fluid volume from the work line increase, the sliding collar 60 is forced aside, exposing an increasing area of the blades of wheel 56a until such time as the pressure times the amount of exposed blade area becomes sufficient to overcome the load on the output shaft 59. The power head housing is provided with two openings 62 and 62a, one of which receives the incoming fluid from line 56a, the other carrying the fluid away in a return line 63 leading back to the selector valve 51 and thence through a one-way check valve 64 into the low pressure return tank 44.

The return flow line 65 from the return tank 44 to the engine is equipped with a solenoid valve 66 which closes, after a short delay, when the ignition is turned off, thus sealing the pressure in the return tank. The delay in valve 66 allows fluid from the tank to flow to the cylinders after the exhaust valves 9 are opened by solenoids 47 when the ignition is turned off. Beyond the solenoid valve 66 the return flow line 65 connects with an input manifold 67 which opens into each of cylinders 2, 2a, 2b and 2c by means of input pressure relief valve 7.

Figure 8 shows a diagram of the circuit controlled by the ignition switch 92, including the solenoid valves 45, 46 and 66.

Briefly summarized, the operation of the power plant and system is as follows: When the ignition switch 92 is turned "on," the solenoid valves 46, 45 and 66 in the compressor line 33, work line 42, and return line 65 are opened. As soon as the compressor line 33 is opened, the compressor 35 starts to work to build up at least a minimum amount of pressure in the intake manifold 27. As the ignition is turned further toward "start," solenoid valves 48 open the intake valves 13 of the first and second cylinders 2 and 2a, allowing them to be charged with fuel. A further twist of the ignition switch closes the solenoids on the intake valves and activates a solenoid which opens the ignition points 19 on the first cylinder 2 and causes it to fire. As the piston of cylinder 2 goes down, the fluid pressure created below it in the cylinder is transmitted to the intake valve 13 on cylinder 2b, charging that cylinder with fuel, and at the same time pressure is transmitted to the exhaust valve 9 of cylinder 2c, allowing that cylinder to exhaust burned gases. As the piston of cylinder 2 nears the bottom of its travel, it opens a valve 17 through which pressure is transmitted to the ignition points 19 on cylinder 2a, and cylinder 2a, having been previously charged, fires. Cylinder number 2a charges 2c, exhausts cylinder 2, fires cylinder 2b, and so the sequence continues.

As the engine runs it pumps fluid into the high pressure tank 28 where the fluid is stored until maximum desired pressure is obtained, at which time the excess fluid is bled off by means of pressure relief valve 43 into the lower pressure return tank. When the accelerator valve 50 is opened, fluid is transported through the work line 42 to the power lines 56a via the selector valve 51 and the fluid flow equalizer 52. The ultimate speed of the output shaft 59 is governed by both the amount of opening of the accelerator valve (hence volume of flow) and the amount of load on the output shaft 59, with the sliding collar 60 in the power head compensating automatically for flow changes and/or load changes.

The fluid from the power head is routed through the return line 63 via the selector valve 51 to the low pressure return tank 44. After a cylinder has fired and the exhaust valve is opened, fluid from the low pressure return tank 44 enters the cylinder and pushes the piston back up the exhaust stroke.

When the ignition switch 92 is turned "off," solenoids 47 open each exhaust valve 9 allowing all pistons to return to firing position. At the same time, the solenoid valves 46 and 45 on the compressor line 33 and the work line 42 close, sealing the pressure in the high pressure tank 28. After a short delay, the solenoid valve 66 in the return flow line 65 closes, sealing the pressure in the return tank.

Since the high pressure tank is always maintained at full pressure, maximum power is always available from standing start to overdrive, and the system is therefore free of the usual automotive problem of attaining high torque when the engine is running at low power and low R. P. M. Due to the elimination of many of the power consuming components and friction losses in the conventional automotive system, a greater percentage of the developed power is delivered to the wheels. This propulsion system would therefore permit use of a smaller engine, with consequent fuel economy, while at the same time making it possible to surpass the performance of the larger and more powerful conventional engines. In addition, the tank of fluid under pressure provides a ready source of power for brakes, steering, seats, windows, and any other accessories or components for which power may be desired.

The basic functioning of the engine is such that the engine may be designed in many different shapes and sizes, may be air cooled or liquid cooled, may have any number of cylinders from three on up, or may have an additional bank or banks of cylinders firing in unison with the basic bank. It may be designed for three cylinders by changing the sequence on the intake valving so that each cylinder charges the next succeeding cylinder to be fired, and by changing the method of firing somewhat so that the intake valve of the cylinder to be fired would be positively closed before the firing took place. The use of ultrasonics to assist in vaporizing the fuel-air mixture could be incorporated in the intake manifold or in the combustion chamber, thus further enhancing economy on fuel. The engine may also be operated in a system in which the fluid goes directly from the cylinders to the transmission or power heads, without using the high pressure tank, in which case the accelerator pedal could be connected to the fuel supply and the compressor governor 37 could be eliminated. Double acting air cylinders (not shown), connected mechanically or hydraulically, may be utilized for fuel-air mixture and pressure in lieu of the compressor as illustrated.

It is apparent, therefore, that the accompanying drawings are intended as illustrative of the basic ideas involved, and are not intended as the sole design of this invention. The drawings and descriptive content portray the system as it might appear in an automobile, but, since this system may be adapted for a great many other uses requiring power, the invention is not to be considered as restricted to automotive power uses.

What is claimed is:

1. A fluid power system including in combination, a two cycle internal combustion engine comprising at least three cylinders, each cylinder having a combustion zone and a coaxial fluid pressure zone, a free floating piston separating said zones and disposed for reciprocation between and into said zones, each combustion zone having separate ignition means and normally closed intake and exhaust valves, each pressure zone having inlet and discharge ports, normally closed valves in said ports, a common high pressure fluid reservoir connected to said discharge ports for storing fluid under the pressure developed in said pressure zones by the reciprocation of respective pistons, a fluid operated motor, a fluid line connecting said motor to said reservoir, means for returning said fluid to said pressure zones through said inlet ports to cause the return strokes of respective pistons, a compressor for charging a fuel-air mixture into said combustion zones through their intake valves, pressure responsive actuating means for the intake and exhaust valves of respective combustion zones, pressure transmitting means leading from the pressure zone of each cylinder, respectively, to the actuating means for the exhaust valve of the cylinder fired in immediate preceding order, and to the actuating means for the intake valve of the cylinder to be charged in next succeeding order, and separate means in each pressure zone for controlling the ignition means of the cylinder to be fired in next succeeding order.

2. A fluid power system including in combination, a two cycle internal combustion engine comprising at least three cylinders, each cylinder having a combustion zone and a coaxial fluid pressure zone, a free floating piston separating said zones and disposed for reciprocation between and into said zones, each combustion zone having separate ignition means and normally closed intake and exhaust valves, each pressure zone having inlet and discharge ports, normally closed valves in said ports, a common high pressure fluid reservoir connected to said discharge ports for storing fluid under the pressure developed in said pressure zones by the reciprocation of respective pistons, a fluid operated motor, a fluid line connecting said motor to said reservoir, means for returning said fluid to said pressure zones through said inlet ports to cause the return strokes of respective pistons, a compressor for charging a fuel-air mixture into said combustion zones through their intake valves, a fluid drive for said compressor, means operatively connecting said fluid drive to said reservoir, pressure responsive actuating means for the intake and exhaust valves of respective combustion zones, pressure transmitting means leading from the pressure zone of each cylinder, respectively, to the actuating means for the exhaust valve of the cylinder fired in immediate preceding order, and to the actuating means for the intake valve of the cylinder to be charged in next succeeding order, and separate means in each pressure zone for controlling the ignition means of the cylinder to be fired in next succeeding order.

3. A fluid power system including in combination, a two cycle internal combustion engine comprising at least three cylinders, each cylinder having a combustion zone and a coaxial fluid pressure zone, a free floating piston separating said zones and disposed for reciprocation between and into said zones, each combustion zone having separate ignition means and normally closed intake and exhaust valves, each pressure zone having inlet and discharge ports, normally closed valves in said ports, a common high pressure fluid reservoir connected to said discharge ports for storing fluid under the pressure developed in said pressure zones by the reciprocation of respective pistons, a fluid operated motor, a fluid line connecting said motor to said reservoir, a low pressure reservoir connected to said motor for storing spent fluid from the latter, means for reducing the pressure in said low pressure reservoir, means for returning fluid from said low pressure reservoir to said pressure zones through said inlet ports, to cause the return strokes of respective pistons, a compressor for charging a fuel-air mixture into said combustion zones through their intake valves, a fluid drive for said compressor, means operatively connecting said fluid drive to said high pressure reservoir, pressure responsive actuating means for the intake and exhaust valves of respective combustion zones, pressure transmitting means leading from the pressure zone of each cylinder, respectively to the actuating means for the exhaust valve of the cylinder fired in immediate preceding order, and to the actuating means for the intake valve of the cylinder to be charged in next succeeding order, and means in each pressure zone for controlling the ignition means of the cylinder to be fired in next succeeding order.

4. The combination as claimed in claim 3, wherein the ignition means of each cylinder is provided with a pressure responsive actuator, means conducting pressure fluid from the pressure zone of the cylinder fired in immediate preceding order to said actuating means and valve means operated by the piston of a fired cylinder for admitting said pressure fluid to the ignition actuating means of a cylinder to be fired in next succeeding order.

5. The combination as claimed in claim 3, including a governor system to regulate the speed of the engine for maintaining the pressure in said first reservoir at a selected level.

References Cited in the file of this patent
UNITED STATES PATENTS

| | | |
|---|---|---|
| 644,085 | Marsh | Feb. 27, 1900 |
| 714,180 | Hendricks | Nov. 25, 1902 |
| 716,794 | Vogt | Dec. 23, 1902 |
| 1,021,241 | Fish | Mar. 26, 1912 |
| 2,344,465 | Lauck | Mar. 14, 1944 |
| 2,423,720 | Mullejans et al. | July 8, 1947 |
| 2,452,194 | Huber | Oct. 26, 1948 |
| 2,471,109 | Hunt | May 24, 1949 |
| 2,593,185 | Renick | Apr. 15, 1952 |